US012809971B2

(12) United States Patent
Taghia et al.

(10) Patent No.: US 12,809,971 B2
(45) Date of Patent: Nov. 24, 2026

(54) GENERATIVE ADVERSARIAL-BASED ATTACK IN FEDERATED LEARNING

(71) Applicant: Telefonaktiebolaget LM Ericsson (publ), Stockholm (SE)

(72) Inventors: Jalil Taghia, Stockholm (SE); Matteo Demartis, Solna (SE); Konstantinos Vandikas, Solna (SE); Selim Ickin, Danderyd (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 114 days.

(21) Appl. No.: 18/293,517

(22) PCT Filed: Aug. 3, 2022

(86) PCT No.: PCT/EP2022/071853
§ 371 (c)(1),
(2) Date: Jan. 30, 2024

(87) PCT Pub. No.: WO2023/012230
PCT Pub. Date: Feb. 9, 2023

(65) Prior Publication Data

US 2025/0094571 A1 Mar. 20, 2025

Related U.S. Application Data

(60) Provisional application No. 63/230,641, filed on Aug. 6, 2021.

(51) Int. Cl.
*G06F 21/55* (2013.01)
*G06N 3/0475* (2023.01)

(52) U.S. Cl.
CPC ......... *G06F 21/554* (2013.01); *G06N 3/0475* (2023.01); *G06F 2221/034* (2013.01)

(58) Field of Classification Search
CPC ............ G06F 21/554; G06F 2221/034; G06N 3/0475; G06N 3/094; G06N 3/098; G06N 7/01; G06N 3/063
See application file for complete search history.

(56) References Cited

U.S. PATENT DOCUMENTS

| | | | | |
|---|---|---|---|---|
| 11,366,930 | B1 * | 6/2022 | Jeong | G06F 21/6254 |
| 11,551,137 | B1 * | 1/2023 | Echauz | G06F 21/554 |
| 12,093,813 | B2 * | 9/2024 | Yao | G06N 3/0464 |
| 12,147,879 | B2 * | 11/2024 | Yu | H04L 63/1425 |
| 12,248,556 | B2 * | 3/2025 | Demir | G06N 3/08 |

(Continued)

FOREIGN PATENT DOCUMENTS

| | | | | |
|---|---|---|---|---|
| CN | 116232656 A * | 6/2023 | | G06N 3/04 |
| WO | WO-2022192568 A1 * | 9/2022 | | G06N 3/047 |

OTHER PUBLICATIONS

International Search Report and Written Opinion of the International Searching Authority, PCT/EP2022/071853, mailed Feb. 13, 2023, 27 pages.

(Continued)

*Primary Examiner* — Christopher A Revak
(74) *Attorney, Agent, or Firm* — Sage Patent Group

(57) ABSTRACT

A method performed by a client node is provided for generating a generative adversarial network (GAN)-based attack for disruption of a global federated learning model. The method includes setting an attack strength factor to a value; and training the GAN using the attack strength factor and an initial adversarial dataset to obtain a malicious weight matrix. The initial adversarial dataset is generated from or by initial weights matrix received from a network node of the global federated learning model and initial malicious weights derived from an initial attack on the global federated learning model that used a deterministic attack to obtain the malicious weight matrix. The method further includes generating the GAN-based attack including (Continued)

an updated malicious weight matrix; and sending the updated malicious weight matrix to the network node.

8 Claims, 7 Drawing Sheets

(56) References Cited

U.S. PATENT DOCUMENTS

| | | | | |
|---|---|---|---|---|
| 2021/0051169 | A1 | 2/2021 | Karame et al. | |
| 2021/0383280 | A1* | 12/2021 | Shaloudegi | G06F 17/18 |
| 2022/0414174 | A1* | 12/2022 | Banipal | G06F 16/90332 |
| 2023/0148116 | A1* | 5/2023 | Stokes, III | G06N 3/08 726/23 |
| 2025/0335876 | A1* | 10/2025 | Light | G06Q 10/1053 |
| 2025/0356170 | A1* | 11/2025 | Naili | G06N 3/0455 |

OTHER PUBLICATIONS

Zhang, Jiale et al., "PoisonGAN: Generative Poisoning Attacks Against Federated Learning in Edge Computing Systems," IEEE Internet of Things Journal, vol. 8, No. 5, Mar. 1, 2021, 13 pages.

Bhagoji, Arjun Nitin et al., "Analyzing Federated Learning through an Adversarial Lens," arXiv:1811.12470v4, Nov. 25, 2019, 19 pages.

Zhang, Jiale et al., "Poisoning Attack in Federated Learning using Generative Adversarial Nets," 2019 19th IEEE International Conference on Trust, Security and Privacy in Computing and Communications/13th IEEE International Conference on Big Data Science and Engineering, Aug. 5, 2019, 7 pages.

Demartis, Matteo, "Adversarial Attacks in Federated Learning," Master's Thesis, KTH Royal Institute of Technology, Mar. 5, 2022, 48 pages.

Zhao, Ying et al., "PDGAN: A Novel Poisoning Defense Method in Federated Learning Using Generative Adversarial Network," S. Wen et al. (Eds.), ICA3PP 2019, LNCS, 11944, 15 pages.

Blanco-Justicia, Alberto et al., "Achieving Security and Privacy in Federated Learning Systems: Survey, Research Challenges and Future Directions," arXiv.org, Dec. 12, 2020, 40 pages.

Bhagoji, Arjun Nitin et al., "Analyzing Federated Learning through an Adversarial Lens," Proceedings of the 36th International Conference on Machine Learning, PMLR 97, 2019, 10 pages.

* cited by examiner

GENERATIVE ADVERSARIAL-BASED ATTACK IN FEDERATED LEARNING

CROSS REFERENCE TO RELATED APPLICATIONS

This application is a 35 U.S.C. § 371 national stage application of PCT International Application No. PCT/EP2022/071853 filed on Aug. 3, 2022, which in turn claims domestic priority to U.S. Provisional Patent Application No. 63/230,641, filed on Aug. 6, 2021, the disclosures and content of which are incorporated by reference herein in their entirety.

TECHNICAL FIELD

The present disclosure relates generally to methods for generating a generative adversarial network (GAN)-based attack for disruption of a global federated learning model, and defending against such an attack, and related methods and apparatuses.

BACKGROUND

Federated learning can be described as a case of distributed learning under privacy constraints. More specifically, agents (also referred to herein as "client nodes" or "clients") participate in a federation to collaborate with each other without sharing their data. In federated learning, a centralized node may maintain a global machine learning (ML) model which is created by aggregating the ML models/weights which are trained in an iterative process at participating agents using local data. Federated learning has gained attention in recent years in a range of domains, including telecommunications and healthcare.

There currently exist certain challenges. Model poisoning refers to a situation where a malicious agent, or several malicious agents, aim at disrupting a global model (e.g., a global federated learning model). Model poisoning can be targeted (e.g., for damaging infostructures of the participating agents), or untargeted (e.g., for degrading the federation accuracy). Model poisoning can also aim to delay convergence of the federation and, thus, cause a high communication cost for the agents in the federation.

SUMMARY

Certain aspects of the disclosure and their embodiments may provide solutions to these or other challenges. Various embodiments include a GAN-based attack technique that can pass existing defense techniques, e.g., monitoring weight statistics. A malicious agent can generate attacks that can go unnoticed by a server's defense system. Some embodiments include a modification to an existing defense based on weight statistics that can partially block the GAN-based attack and reduce damage from the attack, while fully blocking the attacks.

Certain embodiments may provide one or more of the following technical advantages. The generated GAN-based attack may pass existing defense mechanisms and disrupt a federation; and/or a defense process is included that may be employed by a network node for resilience against the malicious agent based on introducing the "friendly" malicious agent that generates the GAN-based attack intentionally as a precaution.

Various embodiments of the present disclosure provide a method performed by a client node for generating a GAN-based attack for disruption of a global federated learning model. The method includes setting an attack strength factor to a value. The method further includes training the GAN using the attack strength factor and an initial adversarial dataset to obtain a malicious weight matrix. The initial adversarial dataset is generated from or by initial weights matrix received from a network node of the global federated learning model and initial malicious weights derived from an initial attack on the global federated learning model that used a deterministic attack to obtain the malicious weight matrix. The method further includes generating the GAN-based attack comprising an updated malicious weight matrix. The method further includes sending the updated malicious weight matrix to the network node.

In some embodiments, the method further includes updating the initial adversarial dataset with the updated malicious weight matrix.

In some embodiments, the method further includes repeating the setting, the training, the generating, and the sending.

In some embodiments, the method further includes tuning the attack strength factor to another value based on an acceptance rate of the network node of the updated malicious weight matrix.

In other embodiments, a client node comprising a GAN for generating a GAN-based attack for disruption of a global federated learning model is provided. The client node comprises at least one processor; and at least one memory connected to the at least one processor and storing program code that is executed by the at least one processor to perform operations. The operations include set an attack strength factor to a value. The operations further includes train the GAN using the attack strength factor and an initial adversarial dataset to obtain a malicious weight matrix. The initial adversarial dataset is generated from or by initial weights matrix received from a network node of the global federated learning model and initial malicious weights derived from an initial attack on the global federated learning model that used a deterministic attack to obtain the malicious weight matrix. The operations further include generate the GAN-based attack comprising an updated malicious weight matrix. The operations further include sending the updated malicious weight matrix to the network node.

In other embodiments, a client node comprising a GAN for generating a GAN-based attack for disruption of a global federated learning model is provided. The client node adapted to perform operations comprising set an attack strength factor to a value. The operations further includes train the GAN using the attack strength factor and an initial adversarial dataset to obtain a malicious weight matrix. The initial adversarial dataset is generated from or by initial weights matrix received from a network node of the global federated learning model and initial malicious weights derived from an initial attack on the global federated learning model that used a deterministic attack to obtain the malicious weight matrix. The operations further include generate the GAN-based attack comprising an updated malicious weight matrix. The operations further include sending the updated malicious weight matrix to the network node.

In other embodiments, a computer program comprising program code to be executed by processing circuitry of a client node is provided, whereby execution of the program code causes the client node to perform operations comprising set an attack strength factor to a value. The operations further includes train the GAN using the attack strength factor and an initial adversarial dataset to obtain a malicious weight matrix. The initial adversarial dataset is generated from or by initial weights received from a network node of the global federated learning model and initial malicious weights derived from an initial attack on the global federated learning model that used a deterministic attack to obtain the malicious weight matrix. The operations further include generate the GAN-based attack comprising an updated malicious weight matrix. The operations further include sending the updated malicious weight matrix to the network node.

In other embodiments, a computer program product comprising a non-transitory storage medium including program code to be executed by processing circuitry of a client node is provided, whereby execution of the program code causes the client node to perform operations comprising set an attack strength factor to a value. The operations further includes train the GAN using the attack strength factor and an initial adversarial dataset to obtain a malicious weight matrix. The initial adversarial dataset is generated from or by initial weights received from a network node of the global federated learning model and initial malicious weights derived from an initial attack on the global federated learning model that used a deterministic attack to obtain the malicious weight matrix. The operations further include generate the GAN-based attack comprising an updated malicious weight matrix. The operations further include sending the updated malicious weight matrix to the network node.

In other embodiments, a method performed by a network node for defending against a GAN-based attack on a global federated learning model is provided. The method includes receiving an updated weight matrix from a client node of the global federated learning model. The updated weight matrix is generated by the GAN. The method further includes passing the updated weight matrix through a weight statistics filter having a variable weight statistics threshold that adapts during training of the global federated learning model. The method further includes identifying the updated weight matrix as a benign update or a malicious update based on a value of the variable weight statistics threshold.

In other embodiments, a network node for defending against a GAN-based attack on a global federated learning model is provided. The network node comprises at least one processor; and at least one memory connected to the at least one processor and storing program code that is executed by the at least one processor to perform operations. The operations include receive an updated weight matrix from a client node of the global federated learning model. The updated weight matrix is generated by the GAN. The operations further include pass the updated weight matrix through a weight statistics filter having a variable weight statistics threshold that adapts during training of the global federated learning model. The operations further include identify the updated weight matrix as a benign update or a malicious update based on a value of the variable weight statistics threshold.

In other embodiments, a network node for defending against a GAN-based attack on a global federated learning model is provided. The network node adapted to perform operations. The operations include receive an updated weight matrix from a client node of the global federated learning model. The updated weight matrix is generated by the GAN. The operations further include pass the updated weight matrix through a weight statistics filter having a variable weight statistics threshold that adapts during training of the global federated learning model. The operations further include identify the updated weight matrix as a benign update or a malicious update based on a value of the variable weight statistics threshold.

In other embodiments, a computer program comprising program code to be executed by processing circuitry of a network node is provided, whereby execution of the program code causes the network node to perform operations comprising receive an updated weight matrix from a client node of the global federated learning model. The updated weight matrix is generated by the GAN. The operations further include pass the updated weight matrix through a weight statistics filter having a variable weight statistics threshold that adapts during training of the global federated learning model. The operations further include identify the updated weight matrix as a benign update or a malicious update based on a value of the variable weight statistics threshold.

In other embodiments, a computer program product comprising a non-transitory storage medium including program code to be executed by processing circuitry of a network node is provided, whereby execution of the program code causes the network node to perform operations comprising receive an updated weight matrix from a client node of the global federated learning model. The updated weight matrix is generated by the GAN. The operations further include pass the updated weight matrix through a weight statistics filter having a variable weight statistics threshold that adapts during training of the global federated learning model. The operations further include identify the updated weight matrix as a benign update or a malicious update based on a value of the variable weight statistics threshold.

BRIEF DESCRIPTION OF DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
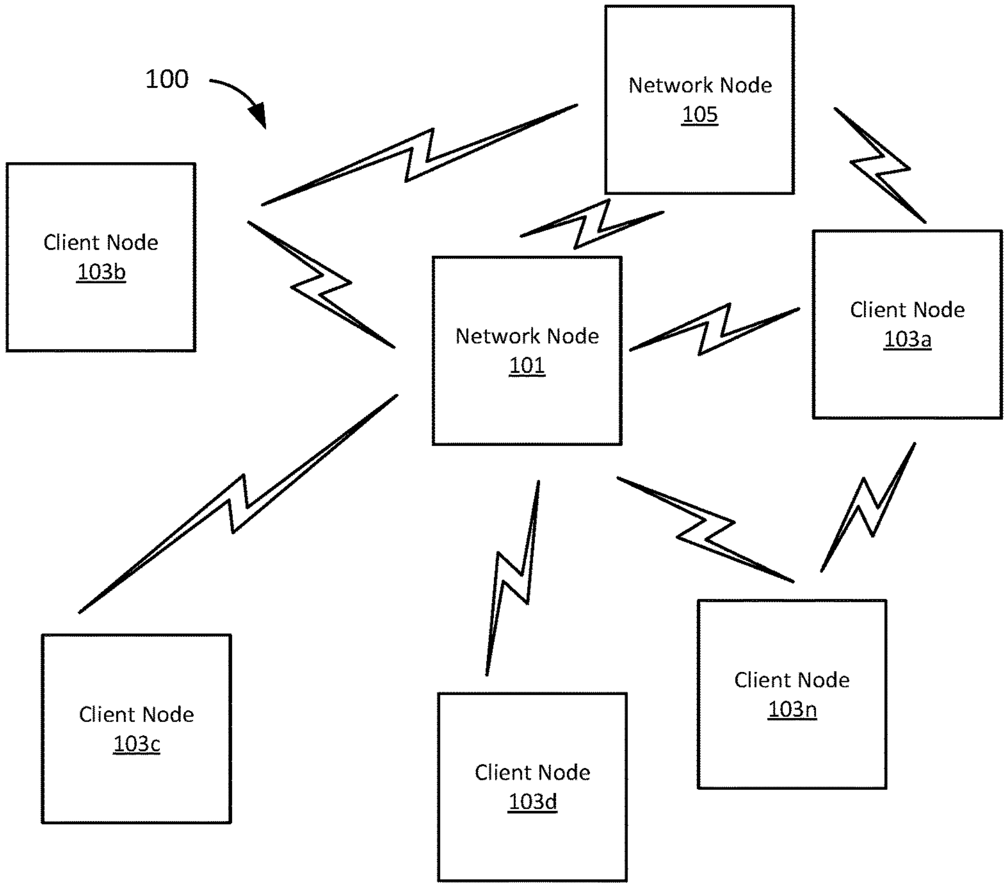
FIG. 1 is an illustration of a communications network illustrating devices that may perform tasks of client nodes and/or network nodes according to some embodiments of the present disclosure.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. The term "client node" is used in a non-limiting manner and can refer to any type of communication device participating in a federation. The term "client node" herein may be interchangeable and replaced with the terms "client", "agent", and/or "worker". A client node that generates and/or sends an initial attack and/or a GAN-based attack to a centralized node for the federation and/or another client node of the federation is referred to herein as a "malicious client". The term "malicious client" herein may be interchangeable and replaced with the terms "malicious agent", "GAN attacker", and/or "attack agent". The term "network node" in the context of generating a GAN-based attack is used in a non-limiting manner and can refer to any type of node in the federation acting as a centralized node for the federation or a client node of the federation that includes the global model residing on the centralized node (e.g., after a number of federation rounds, the model of the client node becomes substantially similar to the global model). In this context, the term "network node" herein may be interchangeable and replaced with the terms "parameter server" and/or "server". The term "network node" in the context of defending against a GAN-based attack is used in a non-limiting manner and can refer to any type of node in the federation that receives a GAN-based attack and performs operations for defending against the GAN-based attack.

In some approaches, a network node in a federation is equipped with a defense mechanism(s) against a model poisoning deterministic attack. In one approach, a simple defense strategy is based on comparing model parameters of agents of a federation and discarding weight contributions that are flagged as outliers. This approach can be referred to as comparing weight statistics, and has been shown to be an approach that can be used against a variety of known deterministic attacks, such as explicit boosting. See e.g., Bhagoji, A. N., Chakraborty, S., Mittal, P, Calo, S., "Analyzing Federated Learning Through An Adversarial Lens", Proceedings of the 36th International Conference on Machine Learning, Long Beach, California, PLMR 97 (2019) (referred to herein as "Bhagoji"). Explicit boosting is discussed further herein.

A defense to a deterministic attack, such as explicit boosting, based on comparing weight statistics of agents will now be discussed. In one approach, an update is checked as to whether it is valid (e.g., benign or not malicious) based on comparing a distance between a specific update and other updates. Given a distance metried (·,·) and a threshold κ, the pairwise distances for all the clients are computed, and a client is flagged as malicious if its distance deviates from others for the threshold κ. The threshold κ must be tuned. As discussed in Bhagoji, for a malicious client, a range may be computed as follows:

$$R_m = \left[\min_{i\in[k]\setminus m} d(\delta_m^t, \delta_i^t), \max_{i\in[k]\setminus m} d(\delta_m^t, \delta_i^t)\right]$$

where $$\delta_i^t$$

is the update of client m at time t. The range $R_m$ is computed for all the clients, then the minimum lower bound, $$R_{min,[k]\setminus m}^l,$$

and maximum upper bound, $$R_{max,[k]\setminus m}^u,$$

are computed. A client is identified as malicious if $$\max\{R_{min}^l - R_m^u, R_{m-}^l R_{max}^u\} > \kappa.$$

A defense to a deterministic attack, such as explicit boosting, based on performance evaluation (e.g., accuracy checking) on holdout data will now be discussed. In one approach, if a validation dataset is available, the network node can check how the accuracy changes when adding the update from client i to the current server weights. When the global model has an accuracy lower than a certain threshold γ compared to the global model generated adding all the other clients but i, then the client i is classified as malicious and the corresponding update is discarded. The threshold γ must be tuned so that benign updates are kept while discarding malicious updates. This method is discussed in, e.g., Bhagoji.

Bhagoji also discusses an explicit boosting attack. In an explicit boosting attack, a malicious agent runs several steps of training using a gradient-based optimizer on malicious data to obtain malicious weights. Given previous weights sent by the server of the federation, malicious update is computed. The malicious update is then boosted by a factor so that once it is sent back to the server, the global weights satisfy a malicious objective. The boosting factor is generally bigger than one and commonly equal to the number of clients. An explicit boosting attack can be effective in reaching a targeted poisoned accuracy. However, as discussed herein, explicit boosting may be ineffective when accuracy checking and/or weight update statistics are used as a defense mechanism.

Thus, existing approaches for generating and defending against a model poisoning attack include potential problems. For example, an explicit boosting attack is shown to be ineffective if the server is equipped with a defense mechanism such as accuracy checking and/or weight update statistics, as discussed herein. In another approach, accuracy checking generally relies on existence of a golden dataset on the server side, which is a limiting factor when such information is not be available (e.g., which may be a typical use case). A golden dataset refers to a dataset that contains a set of curated attacks and normal content that are representative to help ensure that the server can detect an attack. Moreover, while a defense based on comparing weight statistics may be effective against some deterministic attacks such as explicit boosting, such a defense may create a false sense of security because some attacks can pass the defense.

In various embodiments of the present disclosure, a generative attack, e.g., a GAN-based attack, method is provided that can pass existing defense techniques, such as monitoring weight statistics. As a consequence, a GAN attacker may generate a generative attack that goes unnoticed by a defense mechanism of a network node of the federation. Some embodiments further include a modification to a defense based on weight statistics which may partially block the generative attack and/or reduce damage of the generative attack. Blocking all attacks may not be desirable because a defense that blocks all, or substantially all attacks, can block all updates to a global model (e.g., including benign updates). Thus, the modified defense of some embodiments does not fully block the attacks and, as a consequence, may be a more accurate defense in rejecting malicious attacks and passing benign updates.

Certain embodiments may provide one or more of the following technical advantages. By generating a GAN-based attack that may pass existing defense mechanisms and disrupt a federation, preventive defense measures may be employed by a network node to detect the malicious agent(s).

FIG. 1 is a diagram illustrating an example federation 100 for a global federated learning model (also referred to herein as a "global model") where the inventive concepts described herein may be used. The example federation 100 of FIG. 1 includes a network node 101, client nodes 103*a*-103*n*, and network node 105. In this example, network node 101 sends initial weights of the global federated learning model to a client node (e.g. client node 103*a*) and receives an updated malicious weight matrix from the client node (as discussed further herein); and network node 105 defends against a GAN-based attack. While FIG. 1 illustrates five client nodes 103*a* . . . . 103*n*, in practice, client nodes 103*a* . . . . 103*n* can include any non-zero number of client nodes. Similarly, while FIG. 1 illustrates two network nodes 101, 105, in practice federation 100 can include any non-zero number of network nodes. Any client node or network node can perform the operations for generating a GAN-based attack and defending against a GAN-based attack, respectively.

Figure 2:
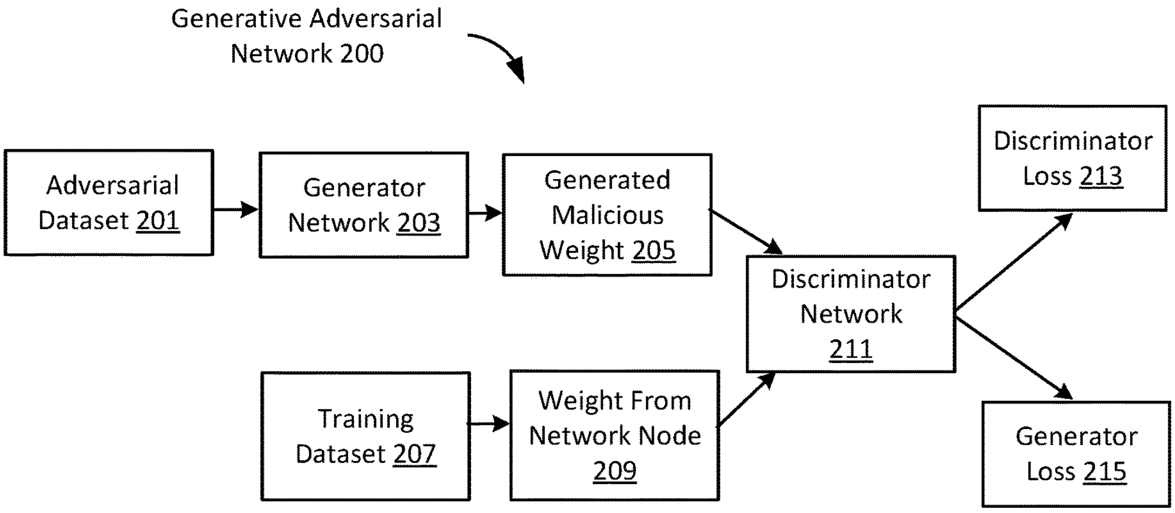
FIG. 2 is block diagram illustrating a generative adversarial network (GAN) that may perform according to some embodiments of the present disclosure.

FIG. 2 is block diagram illustrating a GAN 200. A GAN includes a generator network (e.g., a neural network) and a discriminator network (e.g., another neural network) that are adversarial to one another in generating new, synthetic instances of data that can pass for real data (also referred to herein as "authentic data"). For example, a GAN can be used to generate, and then pass or detect, fake images, fake videos, fake voices, etc.

Referring to FIG. 2, generator network 203 generates new, synthetic data instances (e.g., generated malicious weights 205) that it passes to discriminator network 211. A goal of generator network 203 is to pass the created synthetic data instances 205 to discriminator network 211 to be deemed by discriminator network 211 as authentic, even though they are fake. Discriminator network 211 evaluates the new, synthetic data instances for authenticity. In other words, discriminator network 211 decides whether each instance of synthetic data 205 and training dataset 209 that it reviews is fake or authentic (i.e., belongs to an actual training dataset 207 or not). A goal of discriminator network 211 is to identify the created synthetic data instances 205 coming from generator network 203 as fake.

Still referring to FIG. 2, GAN 200 is trained using random data 201 (referred to herein as "initial adversarial data" or "initial adversarial dataset") and an attack strength factor. The initial adversarial dataset is generated from or by initial weights received from a network node (e.g., network node 101) and initial weights derived from an initial attack on the global federated learning model that used a deterministic attack (as discussed further herein). The deterministic attack can be explicit boosting. The generator network 203 generates a fake, synthetic data instance 205 by transforming the random data 201 into a synthetic fake data instance 205. The synthetic fake data instance 205 is fed into discriminator network 211 along with data (e.g., a weight from network node 101) 209 from an actual, authentic training dataset 207.

Discriminator network 211 operates to classify the generated data 205. Given features of an instance of generated data 205, discriminator network 211 predicts a label or category to which that data belongs (or in other words, maps features to labels). That is, discriminator network 211 returns probabilities of labels (e.g., a number having a value between 0 and 1, with 1 representing a prediction of authenticity and 0 representing fake). Two feedback loops are included. Discriminator network 211 is in a feedback loop with the authenticity of the data 209 from the actual authentic dataset 207, which is known. Generator network 203 is in a feedback loop with discriminator network 211 and incorporates feedback from discriminator 211 on the classification of the data 209. Thus, generator network 203 learns how to detect fake data, and discriminator network 211 learns how to pass fake data.

Generator network 203 and discriminator network 211 each operate to try to optimize a different and opposing objective functions (i.e., a loss functions 213 and 215) in a zero-sum game. As discriminator network 211 changes its behavior, so does generator network 203, and vice versa. Their losses 213, 215 push against each other. Generator loss 215 penalizes generator network 203 for generating a data instance 205 that discriminator network 211 classifies as fake. Generator network 203, thus, tries to minimize generator loss 215. Note that is FIG. 2, generator network 203 is not directly connected to generator loss 215 because the generator network 203 feeds into discriminator network 211, and discriminator network 211 produces the output that GAN 200 is trying to effect. Thus, both generator loss 215 and discriminator loss 213 are connected to discriminator network 211. Discriminator loss 213 penalizes discriminator network 211 for misclassifying an authentic instances of data as fake, or a fake instance created by generator network 203 as authentic. Discriminator network 211, thus, tries to maximize discriminator loss 213.

The feedback loops adjust weights in the correct direction by calculating a weight's impact on the output, that is how the output would change if the weight is changed. Impact of a generator network 203 weight, however, depends on the impact of the discriminator network 211 weights it feeds into, thus, feedback starts at output from discriminator network 211, and flows back through the discriminator network 211 into generator network 203. Training of GAN 200 is discussed further herein including operations for generating malicious weights 205, classifying the generated malicious weights 205 as real (e.g., benign) or fake (e.g., malicious), calculating losses 213, 215 from the classification of discriminator network 211, feedback through discriminator network 211 and generator network 203 to obtain gradients, and using the gradients to change weights of generator network 203.

For ease of discussion, a method for generating attacks that may be used by a malicious agent or a group of malicious agents will be discussed; followed by discussion of a defense method that may partially guard the federation against such generative attacks.

Generation of a GAN-based attack is now discussed. While embodiments are explained in the non-limiting context of five operations, the operations may occur out of the order noted. For example, two operations may be described in succession but may in fact be executed substantially concurrently or the operations may sometimes be executed in the reverse order, depending upon the operations involved. Moreover, the operations may be separated into multiple operations and/or the operations of two or more operations may be at least partially integrated. Finally, other operations may be added/inserted between the operations blocks that are described, and/or operations may be omitted without departing from the scope of inventive concepts.

In generating the GAN-based attack, $D_i=\{X_i, y_i\}$ indicates the dataset for an i-th agent where $X_i$ is the input and $y_i$ is the output response (e.g., such as class labels). An example embodiment of a method performed by a malicious agent (e.g., client node 103*a* in the following example embodiment) and a parameter server (e.g., network node 101 in this example embodiment) includes, without limitation, operations for an initial attack (referred to as "Step 0" and "Step 1" herein) and a GAN-based attack (referred to as "Step 2", "Step 3", and "Step 4" herein).

A first optional operation (e.g., referred to as "Step 0") includes the following.

A malicious agent sends an agent identifier to a parameter server (e.g., network node 101) so that the malicious agent introduces itself as "friendly" to avoid, e.g., blacklisting by the parameter server in the event that the attack is detected.

If a number of total agents (e.g., client nodes 103*a* . . . 103*n*) in the federation (e.g., federation 100) is unknown, the malicious agent initializes a large epsilon (i.e., a large probability of exploring), with a separate attack (or a chain of attacks where epsilon grows exponentially) until the received aggregated weights are statistically different than earlier aggregated weights. The level of difference in the aggregated weights before and after attack indicates the number of agents included in the aggregation of a federation round which is then used to approximate $\eta$ (i.e., an approximation of the number of agents in the federation).

If the number of total agents in the federation is achievable explicitly, the malicious agent receives an acknowledge (ACK) message from the parameter server (as a response of registering the agent identifier) along with the number of agents in the federation. This operation can help to set the n value in the next operation (referred to as "Step 1").

In a second operation (Step 1), initial attacks from an initial pass (i.e., epoch 1) of a training dataset (e.g., training dataset 207) to a subsequent pass (i.e., epoch J) of the training dataset are performed, as discussed below.

In a first operation ("operation a") of Step 1, the malicious agent creates malicious data constructed as $\hat{D}_m=\{X_m, Z_m\}$ where $X_m$ is the input and $z_m$ is the manipulated output response, which can be either targeted or untargeted. In an example embodiment involving classification, the manipulated output response is mislabeled classes. Subscript m indicates the index of the malicious agent.

In a second operation ("operation b") of Step 1, the malicious agent receives benign global updates (e.g., in the case of a neural network these are weight or gradient matrices) from the parameter server, referred to in this example embodiment as $W_S$.

In a third operation ("operation c") of Step 1 of this example embodiment, the malicious agent applies an explicit boosting method and produces malicious updates $\hat{\Delta}_m$, as follows:

Compute malicious weights $\hat{W}_m$ from the malicious data $\hat{D}_m$ using a gradient based optimizer.

Compute the malicious updates using: $\hat{\Delta}_m=\eta(\widehat{W_m}-W_s)$ where $\eta$ is equal to the number of agents in the federation or an approximation of the number of agents in the federation, where n is greater than 1.

$\eta$ can alternatively be learned in advance, e.g., in Step 0 as follows.

The malicious agent applies a change (epsilon) on the local weights when the federated learning is at steady-state (saturated), and observes in the next round how the global weights are impacted after aggregation. If the difference is high, this can indicate that there are not many agents in the federation. The epsilon value can be set to a low value in the beginning, and increase over the rounds by a factor of two until the difference is visible. Alternatively, the number of agents can be shared explicitly by parameter server to the malicious agent (which, for training or preventive defense purposes, was identified/registered to the network node as friendly), if a prior knowledge is possible.

In a fourth operation ("operation d") of Step 1, the malicious agent sends the malicious updates $\hat{\Delta}_m$ to the parameter server (or to another agent of the federation).

Operations b, c, and d of Step 1 are applied for J epochs. At the end of each epoch, the malicious agent updates a training dataset containing the benign and malicious updates:

$$Q_m = \{\hat{\Delta}_m, W_s : \forall\ j = 1, \ldots, J\}$$

In a third operation (referred to as "Step 2"), GAN attacks are performed from epoch J+1 until an end of federation, as follows.

The malicious agent initializes an attack strength factor $\lambda$ of the generator network.

The malicious agent trains a GAN (e.g., GAN 200) using the samples collected in training dataset $Q_m$. The GAN generator and discriminator loss functions (e.g., generator loss 215 and discriminator loss 213) are as follows:

Discriminator loss 213, $L_D$, is defined as:

$$L_D = \frac{1}{|Q_m|}\sum_r \log D(\hat{\Delta}_m^r) + \log D(W_s^r)$$

where $|Q_m|$ indicates the number of elements in dataset $Q_m$ (e.g., training dataset 207), D indicates the discriminator network (e.g., discriminator network 211), and $$\hat{\Delta}_m^r$$

is the r-th malicious update (e.g., of generated malicious weights 205) and $$W_s^r$$

is the r-th benign update (e.g., weight from network node 209) in the set $Q_m$. The discriminator network D is typically a neural network.

Generator loss 215, $L_G$, is defined as:

$$L_G = \frac{1}{|Q_m|}\sum_r \left[(1-\lambda)\ell_{rec}\left(G(W_s^r), \hat{\Delta}_m^r\right) + \lambda \log(1 - D(G(W_s^r)))\right]$$

where G is the GAN generator network (e.g., generator network 203), λ is a scale factor (i.e., the attack strength factor). The generator network is typically a neural network, and $l_{rec}$ is the reconstruction loss, such as mean-squared error (MSE).

In some embodiments. optionally, the malicious agent updates malicious dataset $Q_m$ (e.g., adversarial dataset 201) at epoch r by adding the malicious updates generated by the generator of the GAN, $$G(W_s^r),$$

and the benign updates $$W_s^r.$$

In some embodiments, approaches for updating the adversarial dataset include, without limitation, at least one of the following two approaches:

- Fixed data samples: up until a user-defined number of epochs, data set $Q_m$ is updated.
- Online increasing data: From an epoch r, the accuracy on the malicious local dataset is computed to check if a previous update sent to the parameter server helped in reaching the targeted goal. If the accuracy on the malicious dataset increased, the previously sent malicious update is added in the dataset and the oldest update inserted is removed.

In some embodiments, optionally, the attack strength factor λ is tuned. If λ is increased, the attacks gets stronger (that is, in the sense that an attack becomes more damaging) but at the same time it may become easier for a defense system to detect the attack.

In a fourth operation (referred to as "Step 3"), the malicious agent sends the malicious weights (e.g., generated malicious weights 205) generated by the GAN generator network (e.g., generator network 203) to the parameter server (e.g., network node 101).

In a fifth operation (referred to as "Step 4"), in some embodiments, Steps 2 and 3 are repeated.

A method for defending GAN-based adversarial attacks is now discussed in the context of the above example embodiment.

In some embodiments, the updates generated by the GAN-based adversarial attack may pass through a weight statistics filter and be identified (e.g., flagged) as a benign update.

In some embodiments, the GAN-based adversarial attack is detected by a network node (e.g., network node 101) based on performing a modification to a weight statistics defense method. Instead of using a fixed threshold (e.g., as proposed in Bhagoji), in some embodiments of the present disclosure, an adaptive weight statistics threshold (WST) is used during federated training. The adaptive WST may be kept relatively small for the first training epochs so that the defense is not too strict. After a certain number of epochs, the adaptive WST can be increased. As a consequence, at the beginning, the defense mechanism may be more flexible and it may accept more updates; while later, the defense mechanism may become stricter and can discard some of the updates generated by the GAN. Thus, the method may attenuate damage generated from a GAN-based attack while not blocking an attack completely. As the WST increases, the network node can detect more of the malicious updates, but it may also discard some of the benign updates. In some embodiments, the adaptive WST threshold is set so that as many as possible malicious updates are blocked but, at the same time, no benign updates are discarded.

In some embodiments, the network node performs the adaptive weight statistics defense method. The method includes initialization of an initial threshold κ, where the initial threshold κ is set to a value, e.g. a small value (e.g., 55). The method further includes applying a weight statistics process. In some embodiments, the method further includes increasing the adaptive threshold κ according to a scheduling rule (e.g., an inverse exponential rule). Some embodiments further include repeating the operations of applying the weight statistic process and increasing the adaptive threshold κ.

Figure 3:
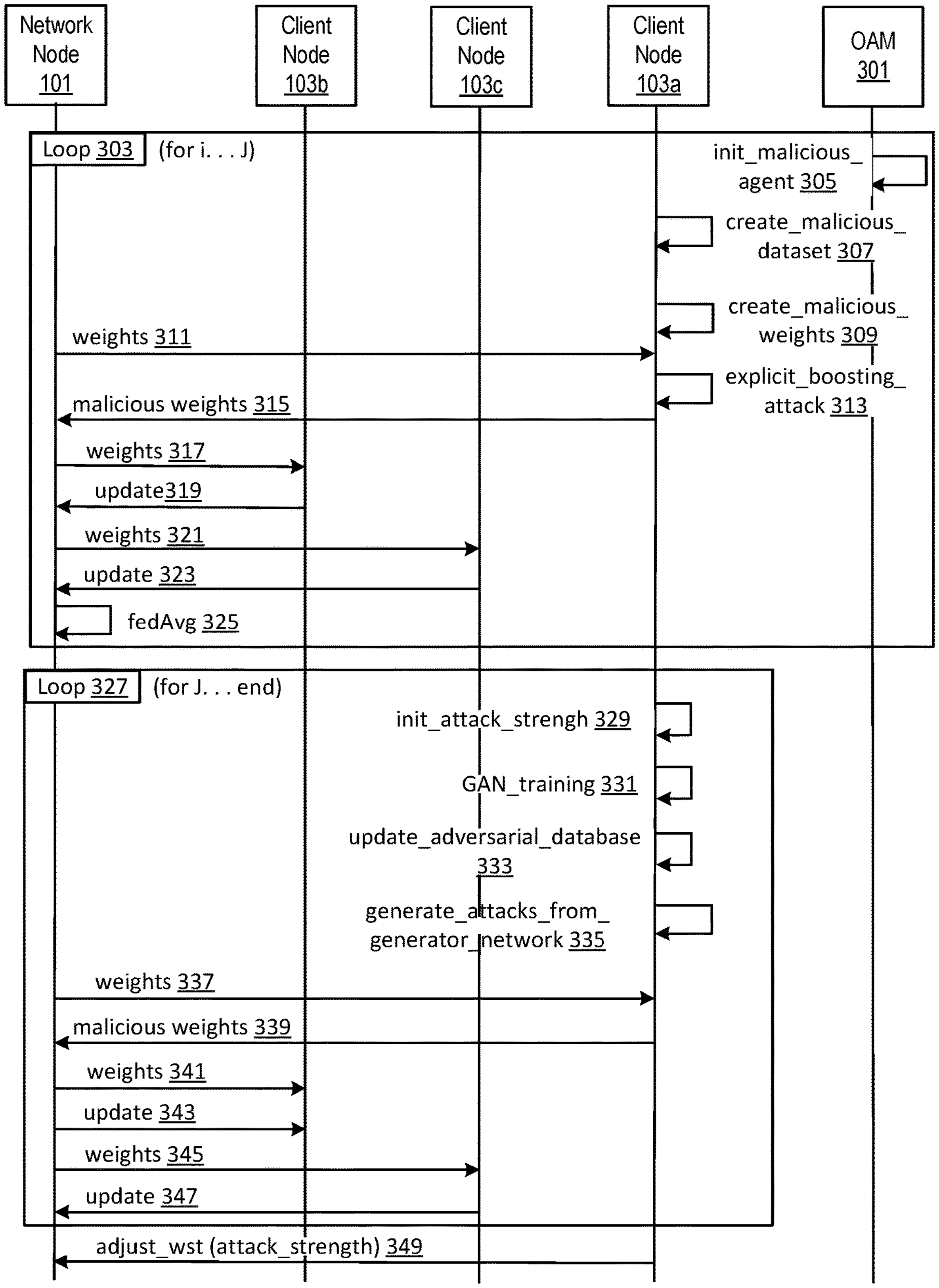
FIG. 3 is a sequence diagram illustrating a weight statistics threshold process in accordance with some embodiments of the present disclosure.

Methods of the present disclosure can be used for preventive defense. Continuing and expanding on the example embodiment, the GAN-based attack is performed periodically within a telecommunications network for preventive purposes. At random points in time, an OAM (Operations, Administration and Management) node (e.g., OAM 301 of FIG. 3) creates and inserts a malicious agent(s) in an ongoing federation(s) for the purpose of proactively calibrating the WST so that the federation model may be made more robust against future attacks. FIG. 3 is a sequence diagram illustrating an example of a WST adjustment in accordance with some embodiments of the present disclosure. Operations 305-325 of loop 303 of FIG. 3 correspond to the initial attack of the example embodiment discussed herein, and operations 329-347 of loop 327 and operation 349 of FIG. 3 correspond to the subsequent GAN-based attack of the example embodiment. In this example embodiment, since the malicious agent was created on demand and the attack strength is known, the attack strength is used as input to adjust the WST.

An experimental evaluation of methods of the present disclosure will now be discussed. The experimental evaluation was performed to illustrate an effectiveness of GAN-based adversarial attacks of the present disclosure in passing defense systems.

In the experimental evaluation, a global federated learning model was trained using a telecommunications dataset containing four agents. A malicious client performed an attack using a GAN model and a server (also referred to herein as a network node) used weight update statistics as a defense mechanism. The evaluation also compared the GAN model with a conventional explicit boosting attack. Table 1 below compares the explicit boosting attack with GAN-based attacks in accordance with some embodiments of the present disclosure. The GAN-based attacks were performed for 32 rounds of federation (i.e., "buffer 32") and three different attack strength factors λ (i.e., λ=0.01, 0.1, and 0.5, respectively). As shown in Table 1, "Test Accuracy" refers to overall accuracy across all labels output by the GAN; "Label 1 Test Accuracy" refers to targeted attacks of the GAN targeting a particular event of a classification problem; and "Acceptance rate" refers to how many times the respective attacks passed the defense mechanism out of 150 times. As shown in Table 1, the explicit boosting failed to pass the defense and all attacks were blocked (i.e., "acceptance rate 0/150"). However, the GAN-based attacks, passed the defense mechanism on several occasions, which results in lower test classification accuracy. Similar observations are seen in Table 1 for the GAN-based attack constructed for the various attack strength factors λ.

TABLE 1

| Method | Test Accuracy | Label 1 Test Accuracy | Acceptance rate |
|---|---|---|---|
| Explicit boosting | 0.778 | 0.557 | 0/150 |
| GAN Attack (buffer 32, λ = 0.01) | 0.732 | 0.0003 | 20/150 |
| GAN Attack (buffer 32, λ = 0.1) | 0.732 | 0 | 39/150 |
| GAN Attack (buffer 32, λ = 0.5) | 0.732 | 0 | 44/150 |

Table 2 below illustrates the effect of varying sample size of the number of rounds of federation for the initial attack for various values of the attack strength factor A. As shown in Table 2, the smallest sample size of 2 was not as effective as the larger sample sizes; and, generally, smaller values of λ resulted in a more effective acceptance rate.

TABLE 2

| Sample Size | λ | Test Accuracy | Label 1 Test Accuracy | Acceptance rate |
|---|---|---|---|---|
| 2 | 0.01 | 0.761 | 0.129 | 148/150 |
| 2 | 0.1 | 0.796 | 0.329 | 148/150 |
| 2 | 0.1 | 0.798 | 0.370 | 148/150 |
| 8 | 0.01 | 0.731 | 0 | 93/150 |
| 8 | 0.1 | 0.732 | 0 | 120/150 |
| 8 | 0.5 | 0.785 | 0.243 | 142/150 |
| 16 | 0.01 | 0.732 | 0 | 51/150 |
| 16 | 0.1 | 0.782 | 0.261 | 125/150 |
| 16 | 0.5 | 0.781 | 0.467 | 123/150 |
| 32 | 0.01 | 0.732 | 0.0003 | 20/150 |
| 32 | 0.015 | 0.732 | 0 | 28/150 |
| 32 | 0.1 | 0.732 | 0 | 39/150 |
| 32 | 0.5 | 0.732 | 0 | 44/150 |
| 64 | 0.01 | 0.732 | 0 | 21/150 |
| 64 | 0.1 | 0.777 | 0.236 | 58/150 |
| 64 | 0.5 | 0.794 | 0.461 | 3/150 |

Figure 4A:
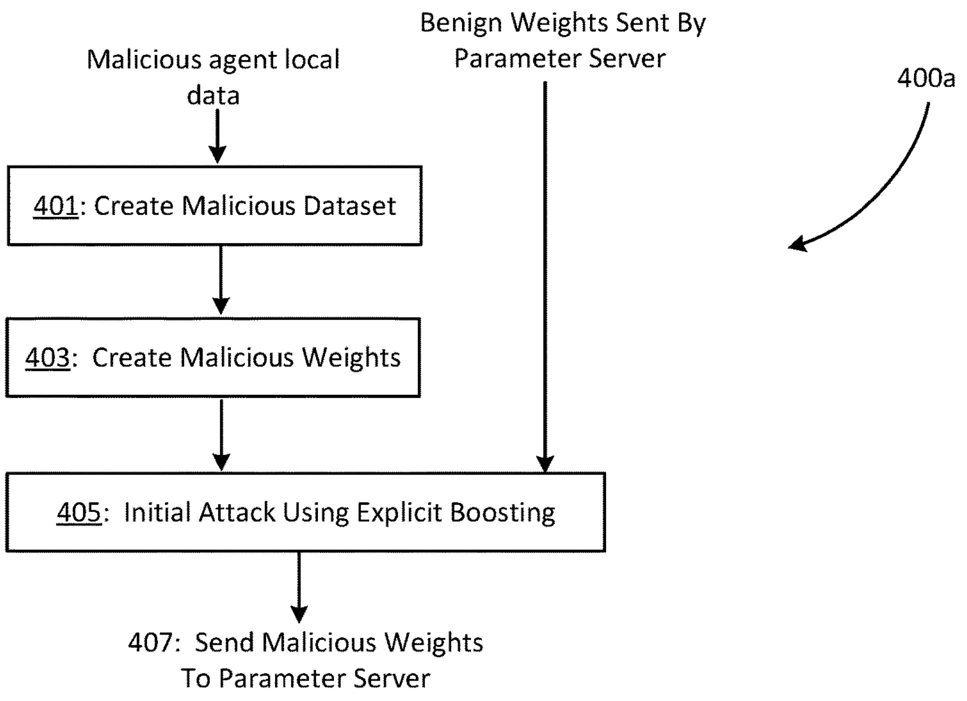
FIGS. 4A and 4B are flowcharts illustrating operations for an initial attack and a GAN-based attack, respectively, in accordance with some embodiments of the present disclosure.
Figure 4B:
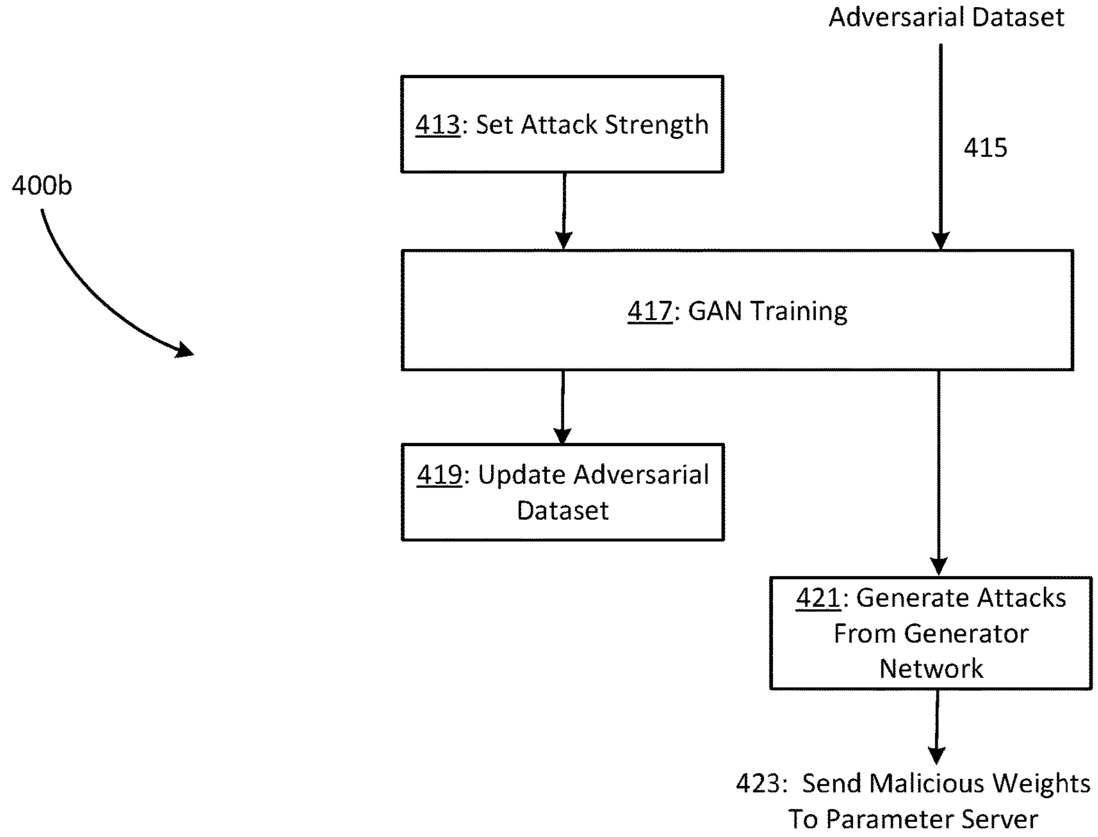

FIGS. 4A and 4B are flowcharts of operations included in the example embodiment discussed herein, including operations for generating an initial attack and a GAN-based attack, respectively. Referring first to the flow chart 400*a* of FIG. 4A for the initial attack, operations of Step 1 of the initial attack are performed including: The malicious agent local data is used to a create malicious dataset 401. The created malicious dataset is used to create 403 malicious weights. The created malicious weights and benign weights received from the parameter server are used to generate 405 the initial attack using explicit boosting. Malicious weights from the initial attack are sent 407 to the parameter server. These operations are discussed further herein with respect to the example embodiment of a method performing Step 1 of the initial attack.

Referring now to flowchart 400*b* of FIG. 4B for the GAN-based attack, the attack strength factor A is set 413 (e.g., initialized or updated) and input to a GAN (e.g., GAN 200) together with the adversarial dataset for GAN training 417. Attacks are generated 421 from the GAN, and malicious weights are sent 423 to the parameter server. In some embodiments, the adversarial database is updated with weights from the GAN training. These operations are discussed further herein with respect to the example embodiment of a method performing Steps 2-4 of the GAN-based attack.

Figure 5:
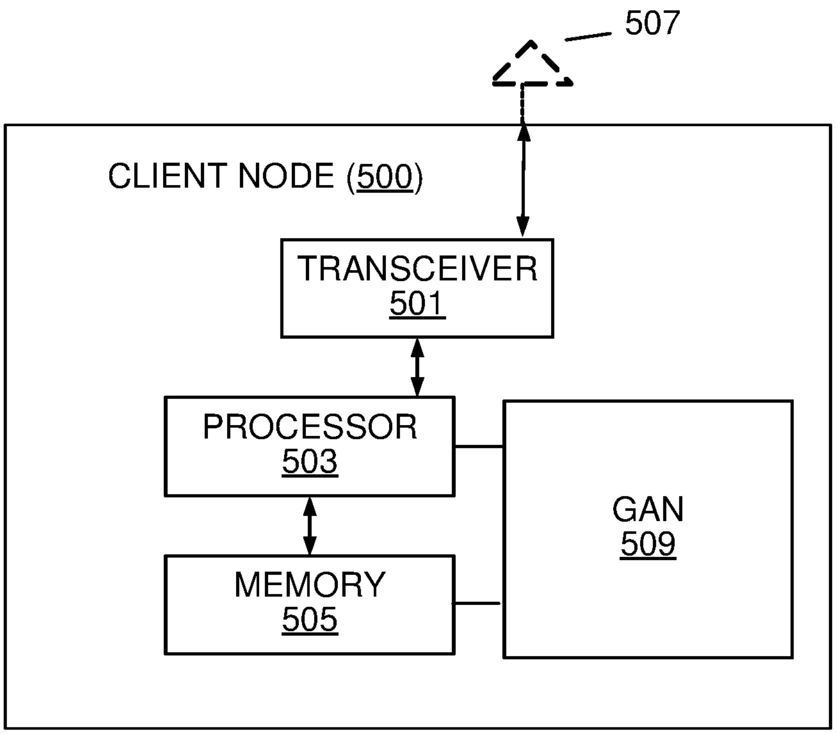
FIG. 5 is a block diagram illustrating a client node according to some embodiments of the present disclosure.

FIG. 5 is a block diagram illustrating elements of a client node 500 configured to provide operations and communication according to embodiments of inventive concepts. (Client node 500 may be provided, for example, as discussed below with respect to wireless devices UE 1012A, UE 1012B, and wired or wireless devices UE 1012C, UE 1012D of FIG. 10, all of which should be considered interchangeable in the examples and embodiments described herein and be within the intended scope of this disclosure, unless otherwise noted.) As shown, client node may include an antenna 507, and transceiver circuitry 501 (also referred to as a transceiver) including a transmitter and a receiver configured to provide uplink and downlink radio communications with a base station(s) (e.g., also referred to as a radio access network (RAN) node or radio base station (RBS)) of a radio access network). Client node may also include processing circuitry 503 (also referred to as a processor) coupled to the transceiver circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that separate memory circuitry is not required. Client node may also include an interface (such as a user interface) coupled with processing circuitry 503, and/or client node may be incorporated in a vehicle. Client node also may include a GAN 509 having a generator network (e.g., a neural network) and a discriminator network (e.g., a neural network). GAN 509 may be communicatively connected to processing circuitry 503 and/or memory 505.

As discussed herein, operations of client node may be performed by GAN 509, which may be communicatively coupled to processing circuitry 503, memory 505, and/or transceiver circuitry 501. For example, GAN 509 may perform respective operations discussed below with respect to example embodiments relating to client nodes, and processing circuitry 503 may control transceiver circuitry 501 to transmit communications through transceiver circuitry 501 over a radio interface to another client node and/or to receive communications through transceiver circuitry 501 from a network node over a radio interface. According to some embodiments, a client node 500 and/or an element(s)/function(s) thereof may be embodied as a virtual node/nodes and/or a virtual machine/machines.

Figure 6:
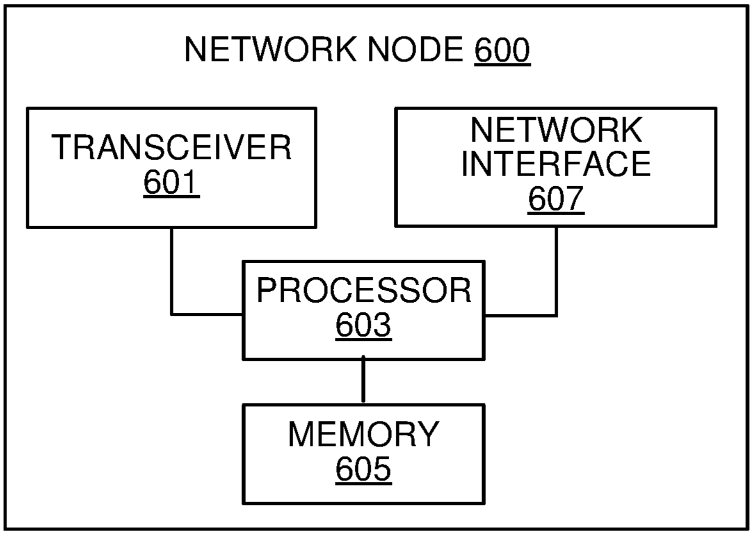
FIG. 6 is a block diagram illustrating a network node according to some embodiments of the present disclosure.

FIG. 6 is a block diagram illustrating elements of a network node 600 of a configured to provide operations and communication according to embodiments of inventive concepts. (Network node 600 may be provided, for example, as a parameter sever of a federation, a network node (e.g., network node 101) that sends initial weights to a client node, a network node for defending against a GAN-based attack (e.g., network node 105), or as discussed below with respect to network node 1010A, 1010B of FIG. 10, and/or a virtual machine, all of which should be considered interchangeable in the examples and embodiments described herein and be within the intended scope of this disclosure, unless otherwise noted.) As shown, the network node may include transceiver circuitry 601 (also referred to as a transceiver) including a transmitter and a receiver configured to provide uplink and downlink radio communications with client nodes. The network node may include network interface circuitry 607 (also referred to as a network interface) configured to provide communications with other nodes (e.g., with other network nodes, or client nodes) of a federation. The network node may also include processing circuitry 603 (also referred to as a processor) coupled to the transceiver circuitry, and memory circuitry 605 (also referred to as memory) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that a separate memory circuitry is not required.

As discussed herein, operations of the network node may be performed by processing circuitry 603, network interface 607, and/or transceiver 601. For example, processing circuitry 603 may control transceiver 601 to transmit downlink communications through transceiver 601 over a radio interface to one or more client nodes or network nodes and/or to receive uplink communications through transceiver 601 from one or more client nodes or network nodes over a radio interface. Similarly, processing circuitry 603 may control network interface 607 to transmit communications through network interface 607 to one or more other network nodes or client nodes and/or to receive communications through network interface from one or more other network nodes or client nodes. Moreover, modules may be stored in memory 605, and these modules may provide instructions so that when instructions of a module are executed by processing circuitry 603, processing circuitry 603 performs respective operations (e.g., operations discussed below with respect to example embodiments relating to network nodes). According to some embodiments, network node 600 and/or an element(s)/function(s) thereof may be embodied as a virtual node/nodes and/or a virtual machine/machines.

According to some other embodiments, a network node may be implemented as a network node without a transceiver. In such embodiments, transmission to a client node or another network node may be initiated by the network node so that transmission to the client node or another network node is provided through a network node including a transceiver. According to embodiments where the network node is a node including a transceiver, initiating transmission may include transmitting through the transceiver.

Figure 10:
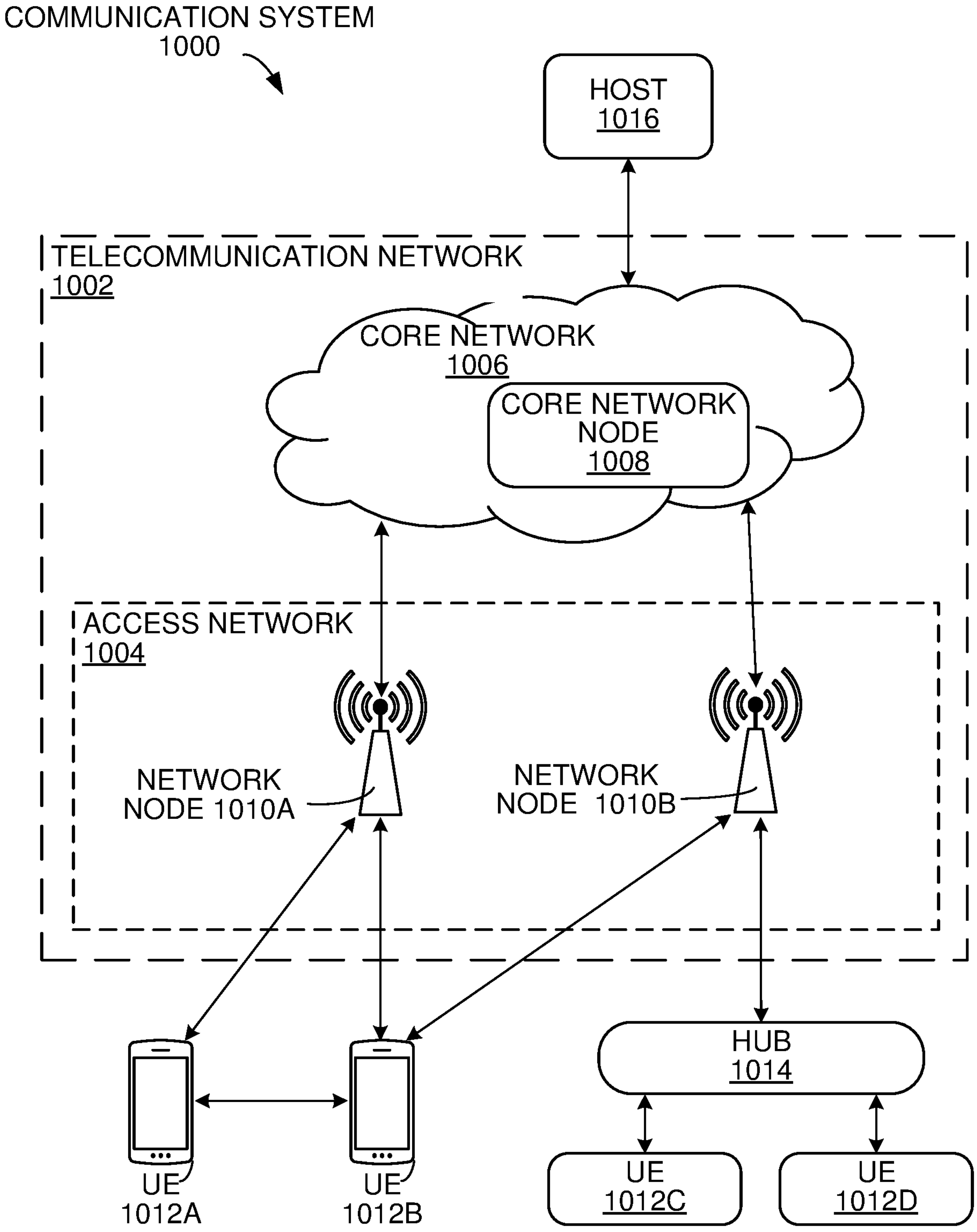
FIG. 10 is a block diagram of a communication system in accordance with some embodiments of the present disclosure.

In the description that follows, while the client node may be any of the client node 500, client node 103*a*, wireless device 1012A, 1012B, wired or wireless devices UE 1012C, UE 1012D of FIG. 10, virtualization hardware, or virtual machines, the client node 500 shall be used to describe the functionality of the operations of the client node. Operations of a client node (implemented using the structure of the block diagram of FIG. 5) will now be discussed with reference to the flow charts of FIGS. 7 and 8 according to some embodiments of inventive concepts. For example, GAN 509 may execute perform respective operations of the flow charts.

Figure 7:
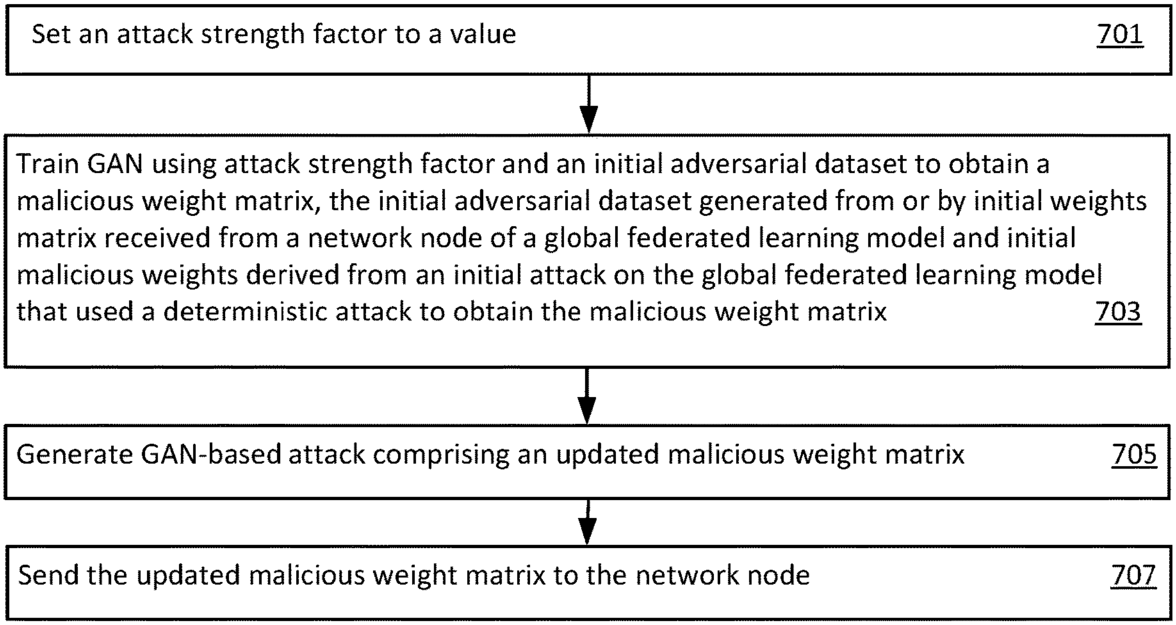
FIGS. 7 and 8 are flow charts illustrating operations of a client node according to some embodiments of the present disclosure.

Referring first to FIG. 7, a method performed by a client node (e.g., 103*a*, 600) for generating a generative adversarial network (GAN)-based attack for disruption of a global federated learning model is provided. The method includes setting (701) an attack strength factor to a value. The method further includes training (703) the GAN using the attack strength factor and an initial adversarial dataset to obtain a malicious weight matrix. The initial adversarial dataset is generated from or by initial weights matrix received from a network node of the global federated learning model and initial malicious weights derived from an initial attack on the global federated learning model that used a deterministic attack to obtain the malicious weight matrix. The method further includes generating (705) the GAN-based attack comprising an updated malicious weight matrix. The method further includes sending (707) the updated malicious weight matrix to the network node.

Figure 8:
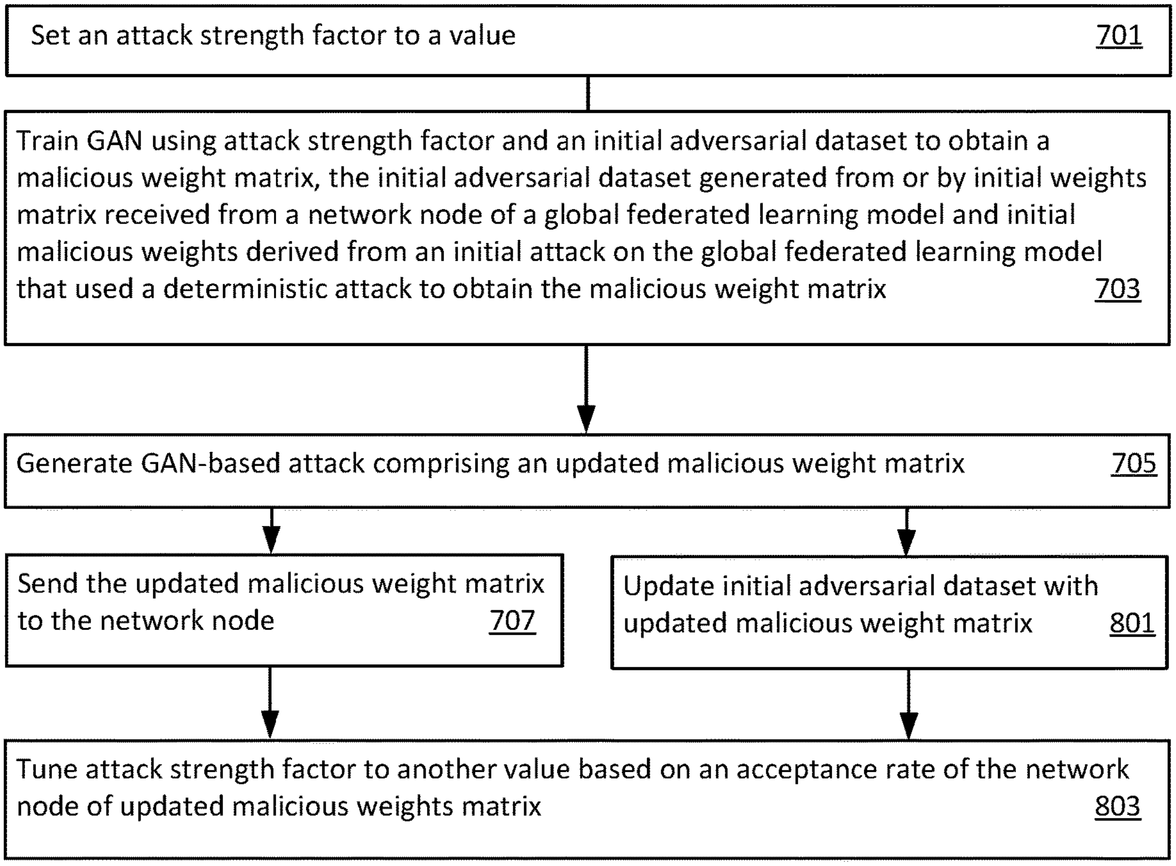

Referring now to FIG. 8, in some embodiments, the method further includes updating (801) the initial adversarial dataset with the updated malicious weight matrix.

In some embodiments, the deterministic attack includes an explicit boosting.

In some embodiments, the method further includes repeating the setting (701), the training (703), the generating (705), and the sending (707).

In some embodiments, the GAN includes a discriminator network and a generator network, and the training (703) includes (i) generating a discriminator loss with the discriminator network based on a number of elements in the initial adversarial dataset, the updated malicious weight matrix, and a weight received from the network node, and (ii) generating a generator loss with the discriminator network based on the number of elements in the initial adversarial dataset, the attack strength factor, and a reconstruction loss of the generator network for the updated malicious weight matrix.

In some embodiments, the updating (801) includes at least one of (i) updating the initial adversarial dataset at a defined round in the training; and (ii) computing an accuracy on a local dataset of the client node comprising the updated malicious weight matrix to check whether a prior updated malicious weight matrix increased the accuracy of the local dataset, adding the prior updated malicious weight matrix when the accuracy increased, and removing an oldest update from the updated adversarial database.

In some embodiments, the method further includes tuning (803) the attack strength factor to another value based on an acceptance rate of the network node of the updated malicious weight matrix.

Various operations from the flow chart of FIG. 8 may be optional with respect to some embodiments of a method performed by a client node. For example, operations of blocks 801-803 of FIG. 8 may be optional.

Operations of a network node (implemented using the structure of FIG. 6) will now be discussed with reference to the flow chart of FIG. 9 according to some embodiments of the present disclosure. In the description that follows, while the network node may be any of the network node 600, network node 105, network node 1010A, 1010B of FIG. 10, or a virtual machine, the network node 600 shall be used to describe the functionality of the operations of the network node. For example, modules may be stored in memory 605 of FIG. 6, and these modules may provide instructions so that when the instructions of a module are executed by respective network node processing circuitry 603, processing circuitry 603 performs respective operations of the flow chart.

Figure 9:
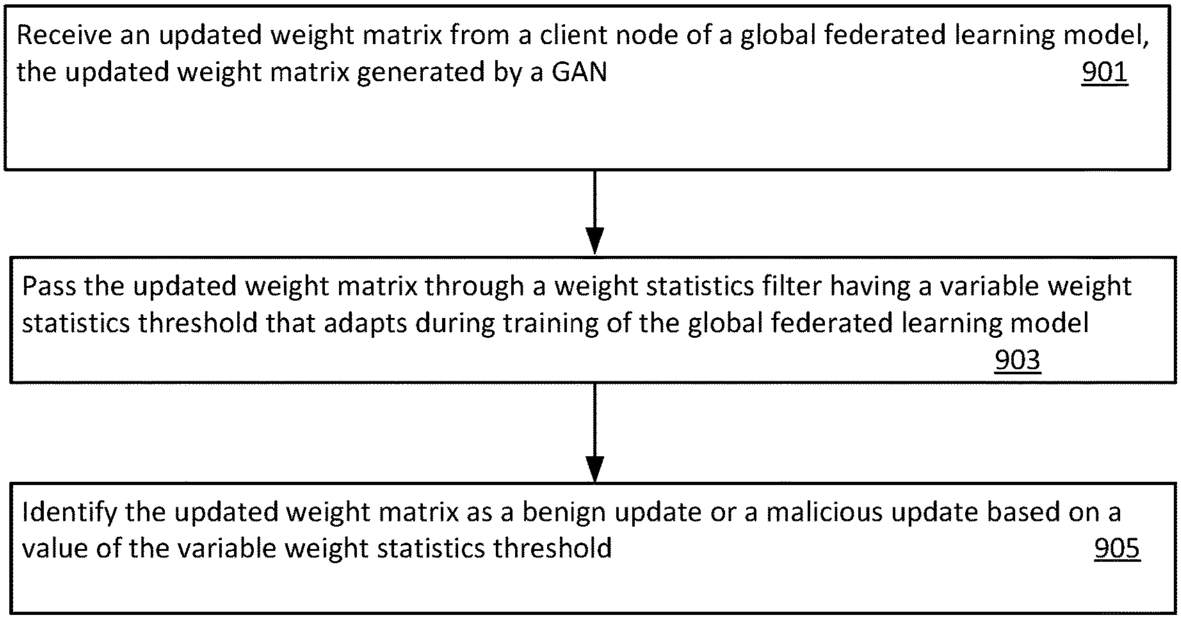
FIG. 9 is a flow chart illustrating operations of a network node according to some embodiments of the present disclosure.

Referring to FIG. 9, a method performed by a network node (e.g., 105, 600) for defending against a generative adversarial network (GAN)-based attack on a global federated learning model is provided. The method includes receiving (901) an updated weight matrix from a client node of the global federated learning model. The updated weight matrix is generated by the GAN. The method further includes passing (903) the updated weight matrix through a weight statistics filter having a variable weight statistics threshold that adapts during training of the global federated learning model. The method further includes identifying (905) the updated weight matrix as a benign update or a malicious update based on a value of the variable weight statistics threshold.

In some embodiments, the variable weight statistics threshold is set to an initial value, and the increase to the variable weight statistics threshold is increased according to a scheduling rule.

In some embodiments, the variable weight statistics threshold is set to an initial value, and the increase to the variable weight statistics threshold is increased based on a learning of the master node that a value of the weight statistics threshold either successfully identified the updated weight as benign or failed to identify the updated weight as malicious.

Although client node 500 and network node 600 are illustrated in the example block diagrams of FIGS. 5 and 6 each may represent a device that includes the illustrated combination of hardware components, other embodiments may comprise client nodes and network nodes with different combinations of components. It is to be understood that each of a client node and a network node comprise any suitable combination of hardware and/or software needed to perform the tasks, features, functions, and methods disclosed herein. Moreover, while the components of each of a client node and a network node are depicted as single boxes located within a larger box, or nested within multiple boxes, in practice, each device may comprise multiple different physical components that make up a single illustrated component (e.g., a memory may comprise multiple separate hard drives as well as multiple RAM modules).

FIG. 10 shows an example of a communication system 1000 in accordance with some embodiments.

In the example, the communication system 1000 includes a telecommunication network 1002 that includes an access network 1004, such as a radio access network (RAN), and a core network 1006, which includes one or more core network nodes 1008. The access network 1004 includes one or more access network nodes, such as network nodes 1010*a* and 1010*b* (one or more of which may be generally referred to as network nodes 1010), or any other similar 3rd Generation Partnership Project (3GPP) access node or non-3GPP access point. The network nodes 1010 (e.g., network nodes 101, 105 of a federation of the telecommunications network) facilitate direct or indirect connection of user equipment (UE) (e.g., a client node of a federation in the telecommunications network), such as by connecting UEs 1012*a*, 1012*b*, 1012*c*, and 1012*d* (one or more of which may be generally referred to as UEs 1012) to the core network 1006 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1000 may include any number of wired or wireless networks, network nodes, UEs, and/or any other components or systems that may facilitate or participate in the communication of data and/or signals whether via wired or wireless connections. The communication system 1000 may include and/or interface with any type of communication, telecommunication, data, cellular, radio network, and/or other similar type of system.

The UEs 1012 may be any of a wide variety of communication devices, including wireless devices arranged, configured, and/or operable to communicate wirelessly with the network nodes 1010 and other communication devices. Similarly, the network nodes 1010 are arranged, capable, configured, and/or operable to communicate directly or indirectly with the UEs 1012 and/or with other network nodes or equipment in the telecommunication network 1002 to enable and/or provide network access, such as wireless network access, and/or to perform other functions, such as administration in the telecommunication network 1002.

In the depicted example, the core network 1006 connects the network nodes 1010 to one or more hosts, such as host 1016. These connections may be direct or indirect via one or more intermediary networks or devices. In other examples, network nodes may be directly coupled to hosts. The core network 1006 includes one more core network nodes (e.g., core network node 1008) that are structured with hardware and software components. Features of these components may be substantially similar to those described with respect to the UEs, network nodes, and/or hosts, such that the descriptions thereof are generally applicable to the corresponding components of the core network node 1008. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1016 may be under the ownership or control of a service provider other than an operator or provider of the access network 1004 and/or the telecommunication network 1002, and may be operated by the service provider or on behalf of the service provider. The host 1016 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1000 of FIG. 10 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1002 is a cellular network that implements 3GPP standardized features. Accordingly, the telecommunications network 1002 may support network slicing to provide different logical networks to different devices that are connected to the telecommunication network 1002. For example, the telecommunications network 1002 may provide Ultra Reliable Low Latency Communication (URLLC) services to some UEs, while providing Enhanced Mobile Broadband (eMBB) services to other UEs, and/or Massive Machine Type Communication (mMTC)/Massive loT services to yet further UEs.

In some examples, the UEs 1012 are configured to transmit and/or receive information without direct human interaction. For instance, a UE may be designed to transmit information to the access network 1004 on a predetermined schedule, when triggered by an internal or external event, or in response to requests from the access network 1004. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 1014 communicates with the access network 1004 to facilitate indirect communication between one or more UEs (e.g., UE 1012*c* and/or 1012*d*) and network nodes (e.g., network node 1010*b*). In some examples, the hub 1014 may be a controller, router, content source and analytics, or any of the other communication devices described herein regarding UEs. For example, the hub 1014 may be a broadband router enabling access to the core network 1006 for the UEs. As another example, the hub 1014 may be a controller that sends commands or instructions to one or more actuators in the UEs. Commands or instructions may be received from the UEs, network nodes 1010, or by executable code, script, process, or other instructions in the hub 1014. As another example, the hub 1014 may be a data collector that acts as temporary storage for UE data and, in some embodiments, may perform analysis or other processing of the data. As another example, the hub 1014 may be a content source. For example, for a UE that is a VR headset, display, loudspeaker or other media delivery device, the hub 1014 may retrieve VR assets, video, audio, or other media or data related to sensory information via a network node, which the hub 1014 then provides to the UE either directly, after performing local processing, and/or after adding additional local content. In still another example, the hub 1014 acts as a proxy server or orchestrator for the UEs, in particular in if one or more of the UEs are low energy loT devices.

The hub 1014 may have a constant/persistent or intermittent connection to the network node 1010*b*. The hub 1014 may also allow for a different communication scheme and/or schedule between the hub 1014 and UEs (e.g., UE 1012*c* and/or 1012*d*), and between the hub 1014 and the core network 1006. In other examples, the hub 1014 is connected to the core network 1006 and/or one or more UEs via a wired connection. Moreover, the hub 1014 may be configured to connect to an M2M service provider over the access network 1004 and/or to another UE over a direct connection. In some scenarios, UEs may establish a wireless connection with the network nodes 1010 while still connected via the hub 1014 via a wired or wireless connection. In some embodiments, the hub 1014 may be a dedicated hub—that is, a hub whose primary function is to route communications to/from the UEs from/to the network node 1010*b*. In other embodiments, the hub 1014 may be a non-dedicated hub—that is, a device which is capable of operating to route communications between the UEs and network node 1010*b*, but which is additionally capable of operating as a communication start and/or end point for certain data channels.

In the above description of various embodiments of the present disclosure, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being “connected”, “coupled”, “responsive”, or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation “e.g.”, which derives from the Latin phrase “exempli gratia,” may be used to introduce or specify a general example or examples of a previously mentioned item, and is not intended to be limiting of such item. The common abbreviation “i.e.”, which derives from the Latin phrase “id est,” may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

What is claimed is:

1. A method performed by a network node for defending against a generative adversarial network (GAN)-based attack on a global federated learning model, the method comprising:

receiving an updated weight matrix from a client node of the global federated learning model, wherein the updated weight matrix is generated by the GAN;

passing the updated weight matrix through a weight statistics filter having a variable weight statistics threshold that adapts during training of the global federated learning model; and identifying the updated weight matrix as a benign update or a malicious update based on a value of the variable weight statistics threshold.

2. The method of claim 1, wherein:

the variable weight statistics threshold is set to an initial value; and the variable weight statistics threshold is increased according to a scheduling rule.

3. The method of claim 1, wherein;

the variable weight statistics threshold is set to an initial value; and the variable weight statistics threshold is increased based on a learning of a master node that a value of the variable weight statistics threshold either successfully identified the updated weight as benign or failed to identify the updated weight as malicious.

4. A network node for defending against a generative adversarial network (GAN)-based attack on a global federated learning model, the network node comprising:

at least one processor;

at least one memory connected to the at least one processor and storing program code that is executed by the at least one processor to perform operations comprising:

receiving an updated weight matrix from a client node of the global federated learning model, wherein the updated weight matrix is generated by the GAN;

passing the updated weight matrix through a weight statistics filter having a variable weight statistics threshold that adapts during training of the global federated learning model; and identifying the updated weight matrix as a benign update or a malicious update based on a value of the variable weight statistics threshold.

5. The network node of claim 4, wherein:

the variable weight statistics threshold is set to an initial value; and the variable weight statistics threshold is increased according to a scheduling rule.

6. The network node of claim 4, wherein;

the variable weight statistics threshold is set to an initial value; and the variable weight statistics threshold is increased based on a learning of a master node that a value of the variable weight statistics threshold either successfully identified the updated weight as benign or failed to identify the updated weight as malicious.

7. The method of claim 2, wherein the scheduling rule is an inverse exponential rule.

8. The method of claim 1, further comprises adjusting the variable weight statistics threshold, wherein the adjusting is based on a known attack strength used to train the GAN generating the GAN-based attack.

* * * * *